(12) United States Patent
Warner

(10) Patent No.: US 11,759,963 B1
(45) Date of Patent: Sep. 19, 2023

(54) CLIPPING TOOL

(71) Applicant: Patrick Warner, Bozeman, MT (US)

(72) Inventor: Patrick Warner, Bozeman, MT (US)

( * ) Notice: Subject to any disclaimer, the term of this patent is extended or adjusted under 35 U.S.C. 154(b) by 0 days.

(21) Appl. No.: 17/656,219

(22) Filed: Mar. 23, 2022

(51) Int. Cl.
| | |
|---|---|
| *B26B 17/00* | (2006.01) |
| *A45D 29/02* | (2006.01) |
| *B25G 1/10* | (2006.01) |
| *A01K 9/00* | (2006.01) |
| *A01K 97/00* | (2006.01) |

(52) U.S. Cl.
CPC .............. *B26B 17/00* (2013.01); *A01K 9/00* (2013.01); *A45D 29/023* (2013.01); *B25G 1/102* (2013.01)

(58) Field of Classification Search
CPC ...... A45D 29/02; A45D 29/023; A45D 29/04; A45D 29/12; A45D 2029/026; B26B 17/00; A01K 97/00; B25G 1/102
USPC .......... 7/106, 132, 133, 158, 162; 30/26, 27, 30/28, 29, 124, 127, 179, 186, 187, 188, 30/189, 190, 191, 192, 193, 287
See application file for complete search history.

(56) References Cited

U.S. PATENT DOCUMENTS

| | | | | |
|---|---|---|---|---|
| 2,790,376 A | * | 4/1957 | Kennedy | F24F 13/08 454/331 |
| 2,799,923 A | * | 7/1957 | Senshu | A45D 29/023 30/28 |
| 8,984,754 B1 | * | 3/2015 | Kaidi | A45D 29/02 30/28 |
| 2018/0020803 A1 | * | 1/2018 | Smothermon | A45D 29/04 30/28 |

* cited by examiner

*Primary Examiner* — Lee D Wilson
*Assistant Examiner* — Alberto Saenz
(74) *Attorney, Agent, or Firm* — Ivan E. Rozek; Savantek Patent Services

(57) ABSTRACT

A portable environmentally friendly clipping tool that includes spring biased upper and lower hinged rigid members, removable clipping teeth, and side walls, forming an enclosed storage area for trapping clipped remains until the user finds a non-polluting location to dispose of the trapped clippings. Clipping removal is facilitated by raising a hinged side wall on the tool enabling the user to pour out the stored clippings from the tool. A pair of C-shaped walls within the tool are positioned in a way that during non-use, the lower portion of one C-shaped wall blocks the open portion of the second C-shaped wall. When the user pushes down on the upper rigid member, a clipping action can take place and the open portion of both C-shaped walls align, allowing clipped remains to migrate into the enclosed storage area of the clipper and be captured for later disposal.

9 Claims, 10 Drawing Sheets

CLIPPING TOOL

CROSS REFERENCE TO RELATED APPLICATIONS

Not Applicable

STATEMENT REGARDING FEDERALLY SPONSORED RESEARCH OR DEVELOPMENT

Not Applicable.

DESCRIPTION OF ATTACHED APPENDIX

Not Applicable

BACKGROUND OF THE INVENTION

This invention relates generally to the field of portable handheld clipping tools and more specifically to a clipping tool, also known as a nipper, for assisting in fishing related activities.

When attaching a fishing line to a hook, fishermen are left with a short length of residual line, known as a tag end, that needs to be clipped so that it does not interfere with normal fishing activity. These short, clipped lengths of fishing line are often dropped in a water body such as a lake or stream where fishing is taking place. Although low impact individually, an accumulation of tag ends can lead to a significant amount of pollution. To solve this problem, it is an object of the present invention to trap the tag ends within an enclosure in the clipping tool for future disposal in a non-polluting location. It is another object of the invention to include a hook eyelet cleaning tool as an integral part of the clipping tool. Another object of the invention is to provide a side panel that can easily swing open to empty the tag ends stored within the clipping tool.

BRIEF SUMMARY OF THE INVENTION

It is an object of the present invention to provide a clipping tool that can trap a clipped object within the tool for future disposal. This is achieved by a one-way passage leading to a storage container. The one-way passage is opened when the user presses down on the tool, allowing the clipped object, such as tag ends or fingernails, to drop and become trapped in an enclosed chamber. The clipped objects are accumulated and sealed in the enclosed chamber until it is emptied by the user.

It is another object of the invention to include a fishing hook eyelet cleaning tool integrated with the clipping tool and hidden within the clipping tool storage container.

Another object of the invention is to provide an easy way to have access to the enclosed chamber, such as a movable side panel, that can easily swing open to empty the accumulated clipped objects, such as tag ends, trapped within the clipping tool enclosed chamber.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a clipping tool having an upper rigid member, a lower rigid member, a fixed right side wall member, and a hinged left side wall member, all forming a hollow, essentially cuboid enclosure comprising a storage compartment; the upper and lower rigid members terminating at the front end in clipping teeth and at the opposite end in a pinned hinge member.

A compression spring within the hollow enclosure creates a spring bias between the upper rigid member and the lower rigid member.

A hook eyelet cleaner, hidden within the hollow enclosure, is accessible only by opening the side panel, thereby protecting it from damage and the elements.

The upper rigid member and the lower rigid member each comprise a rectangular-C-shaped gate member, the C-shaped gate members separating the hollow enclosure to the front cutting and gate compartment and the rear storage compartment. The C-shaped gate members are offset with respect to each other so that the lower arm of the C-shaped member attached to the upper rigid member blocks the central gap of the lower rigid member's C-shape, thereby blocking the entrance to the enclosure until the user presses down on the upper rigid member. Pressing down against the spring bias in a cutting manner causes the gaps of both C-shaped members to align with each other, creating an opening formed by the alignment of the central gaps of both the C-shaped members allowing a cut length of fishing line or other cut object to migrate from the clipping teeth to the inside of the storage compartment.

The opening between the front cutting compartment to the storage compartment returns to the closed position when the user releases pressure on the upper rigid member thus causing the upper rigid member to return to its original spring biased position, thereby securing the clipped item and preventing it from falling out or escaping from the storage compartment.

The clipping tool operates effectively as a one-way passage for clipping items. Clipped objects can enter the storage compartment when the clipping tool is in a cutting position but are unable to escape the compartment as the C-shaped members trap them in a non-cutting state and the cutting members seal the chamber when the clipping tool is in a cutting shape. Therefore, any contents captured within the storage compartment is securely contained until the user decides to utilize the hinged left side member to empty the storage compartment.

A stop on the upper rigid member located in the hinge area prevents over-opening by the spring by stopping itself on the aligned stopper on the lower rigid member;

A pin at the terminating end of the clipping tool upper and lower rigid members functions as both, a hinge and an anchor point for the user to attach a necklace or other device to assist with carrying the clipping tool.

U shaped cutouts on the sides of the clipping tool, perpendicular to the clipping teeth, allow the user to clip longer lengths of line.

The clipping tool can be used for clipping a variety of items including but not limited to keratin nails, wire, string, monofilament fishing line, fluorocarbon fishing line, fishing braid, hair and other similar items.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
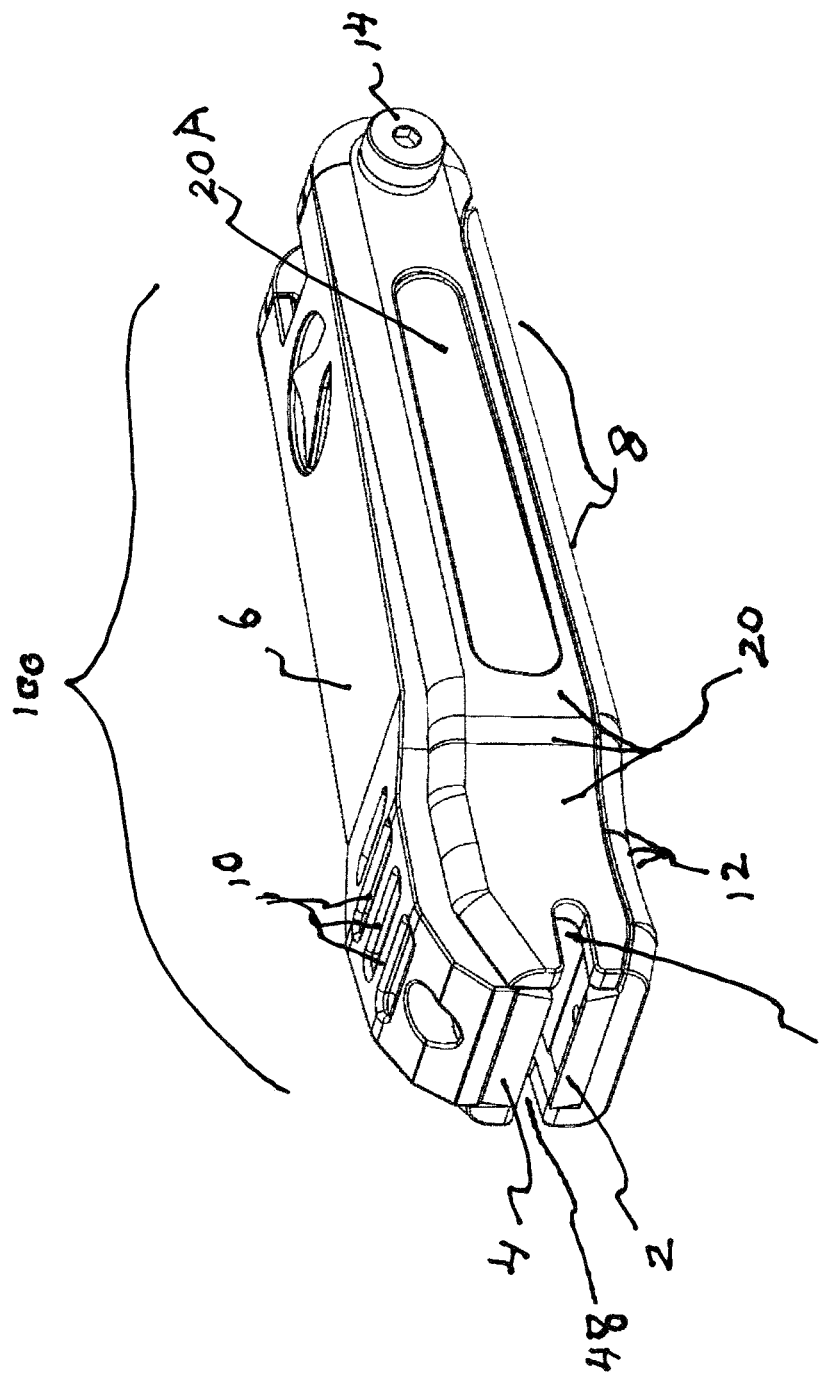
FIG. 1 is a front perspective view of the embodiment.

Referring now to FIG. 1 we see a perspective view of the clipping tool 100. The clipping tool 100 is intended to be a handheld item and includes a main body comprised of an upper rigid member 6 a lower rigid member 8, a left side wall member 20 and a right-side wall member 50 forming a cuboid enclosure otherwise known as a storage compartment. The upper rigid member 6 terminates at its front end in a cutting member 4. The lower rigid member 8 terminates at its front end in cutting member 2. Both upper and lower members 6, 8 are hingedly connected by hinge pin 16, shown in FIG. 2. The upward ergonomically curved upper rigid member top surface comprising depressions 10 whereby providing a gripping area for the user's thumb and concave area 12 provides a comfortable cradle for the user's index finger. By pushing down on upper rigid member 6, the cutting members 2, 4 are caused to close thereby providing a clipping action to cut fluorocarbon fishing line, monofilament fishing line, braded fishing line, or other objects including fingernails, wire, or string. Left side wall rigid member 20 is capable of swinging upward as shown in FIG. 3. The depressed area 20A allows the user to grab the member 20 more easily by lifting the member 20 via the underside of the depressed area 20A with one's fingernail. Alternately, area 20A can be filled with a secondary panel that is fixed to the depressed area and can include the name of a company or other graphic design. The cut away portions 46, 48 at the front end of right and left side wall members 20, 50 allow the user to slide a fishing line into the clipper teeth 2, 4 and diagonally out through the cut away areas 46, 48 so that a long length of fishing line can be cut. Normally, the user slides the fishing line in a perpendicular orientation with respect to cutting members 2, 4 and, if a longer tag end, the fishing line is stopped by a wall 30A within the enclosed area as will be described in detail when referring to FIGS. 3, 5, 6 and 8.

Figure 2:
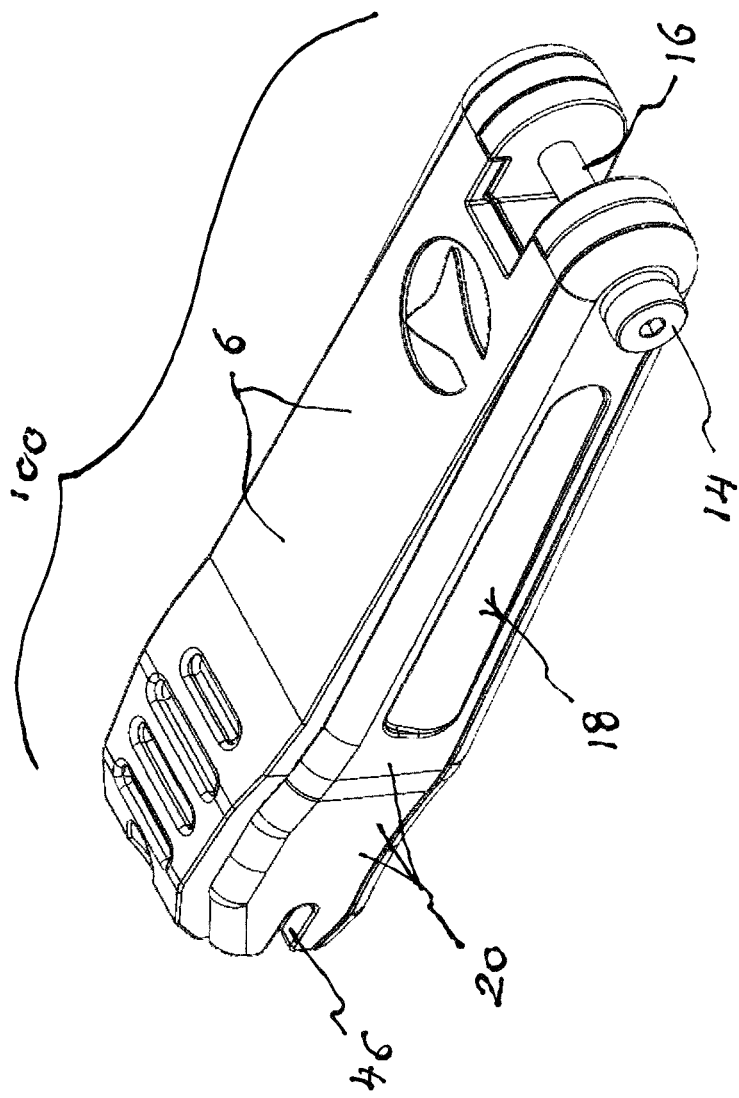
FIG. 2 is a rear perspective view of the embodiment.
Figure 3:
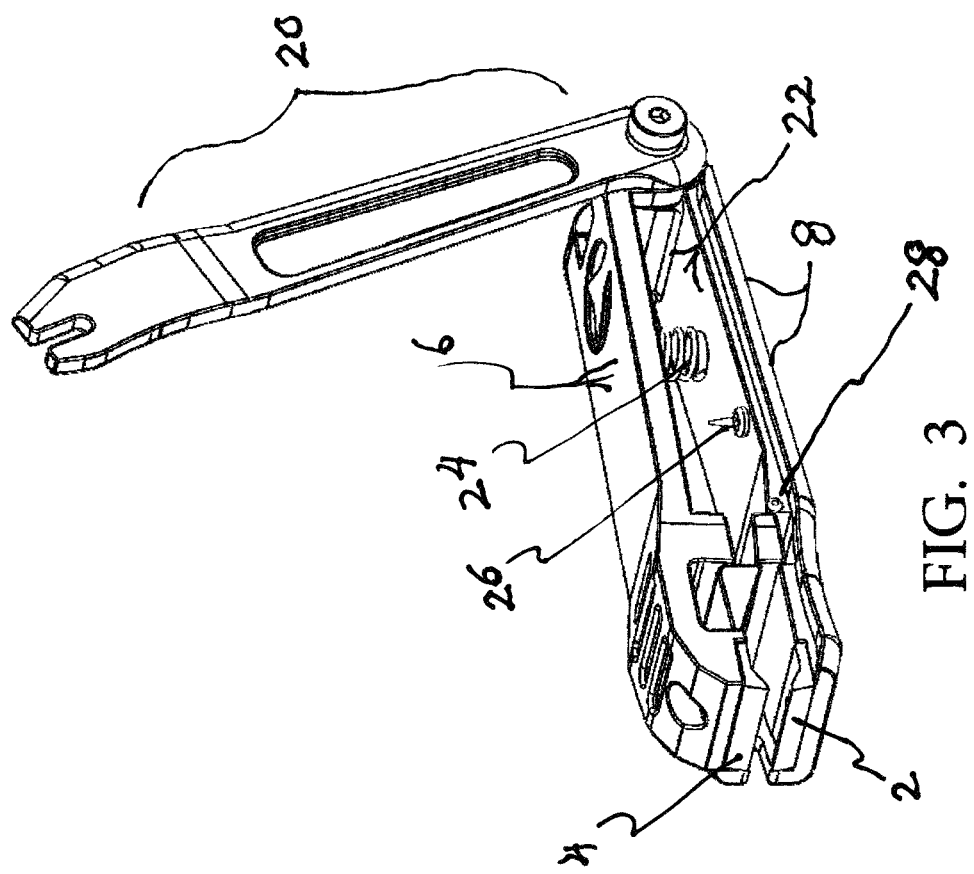
FIG. 3 is a perspective view of the embodiment with the hinged left side wall member in the lifted and the interior of the enclosure visible.

FIG. 2 is a perspective view that shows the rear portion of the clipping tool 100. Pivot pin 16 can be seen holding upper rigid member 6 and lower rigid member 8 rotatably in place. Pin 16 terminates at one end in tightening head 14 and at the other end in threads, not shown, that engage matching threads, not shown, in the side wall 50.

FIG. 3 is a perspective view that shows left side wall 20 rotated to the up position exposing the interior of the enclosed area formed by a lower rigid member 8, right side member 50 and an upper rigid member 6 as well as left side wall 20. A compression spring 24 can be seen within the enclosure which can compress and extend as the user presses and then releases upper rigid member 6. A pointed nail-like member 26 is also found in the enclosure and is fixedly attached to lower rigid member 8. The nail-like member 26 can be used to clear out debris from the eyelet portion of a fishhook. The hollow cuboid enclosed space 22 can store clipped fishing lines or other clipped remains which can then be disposed of by rotating left side wall 20 upwards and dumping the short length of lines or other remains into a non-polluting receptacle or designated landfill area rather than into a waterbody such as a stream, river, or lake. Extended bump-out 28 can engage with depression 60 shown in FIG. 4 to cause a positive but releasable closure between left side wall 20 and the exposed edge of lower rigid member 8.

Figure 4:
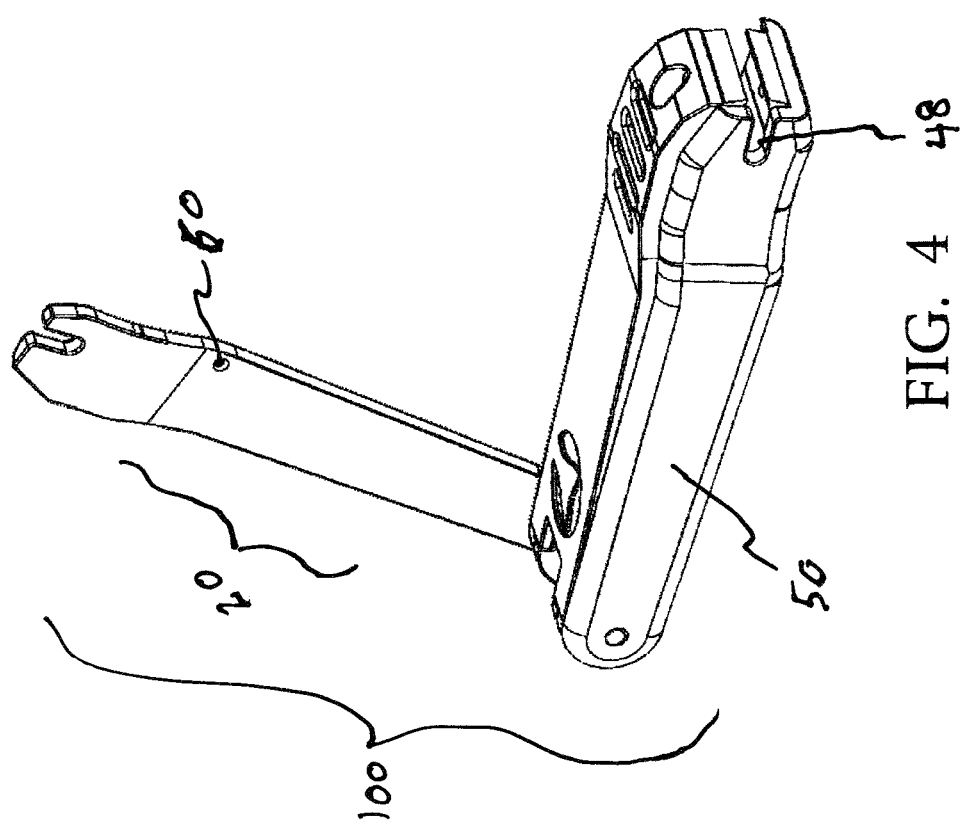
FIG. 4 is a perspective view of the embodiment showing the opposite side of the embodiment while the hinged left side wall member is in the lifted position.

FIG. 4 is a perspective view of the clipping tool 100 showing the right-side wall member 50. Left side wall member 20 is rotated up allowing depression 60 to be seen.

Figure 5:
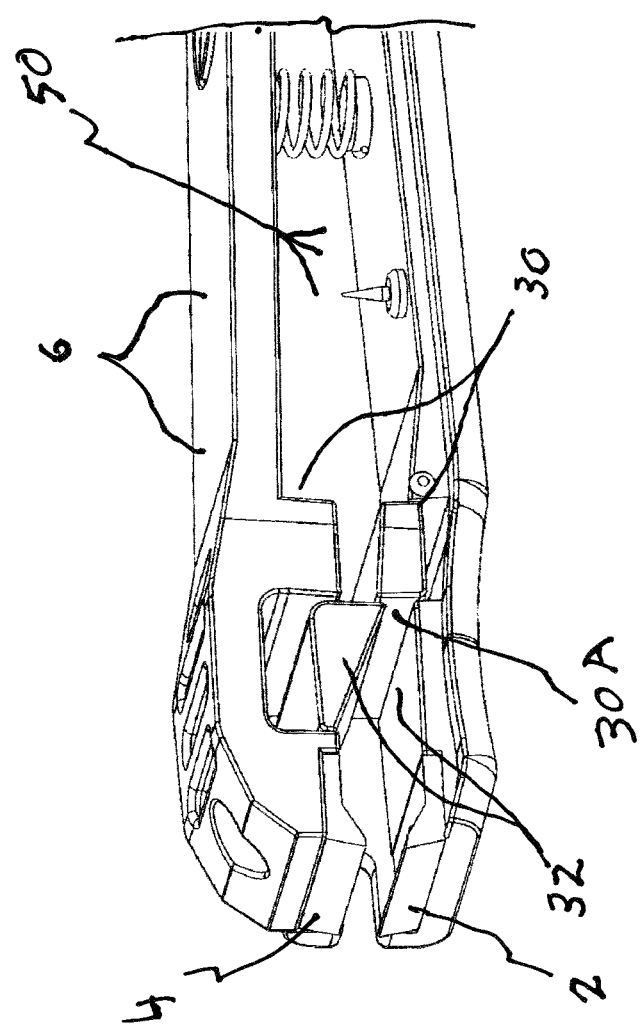
FIG. 5 is a partial side view of the embodiment with the clipper teeth in the open position with the hinged side wall member removed.
Figure 8:
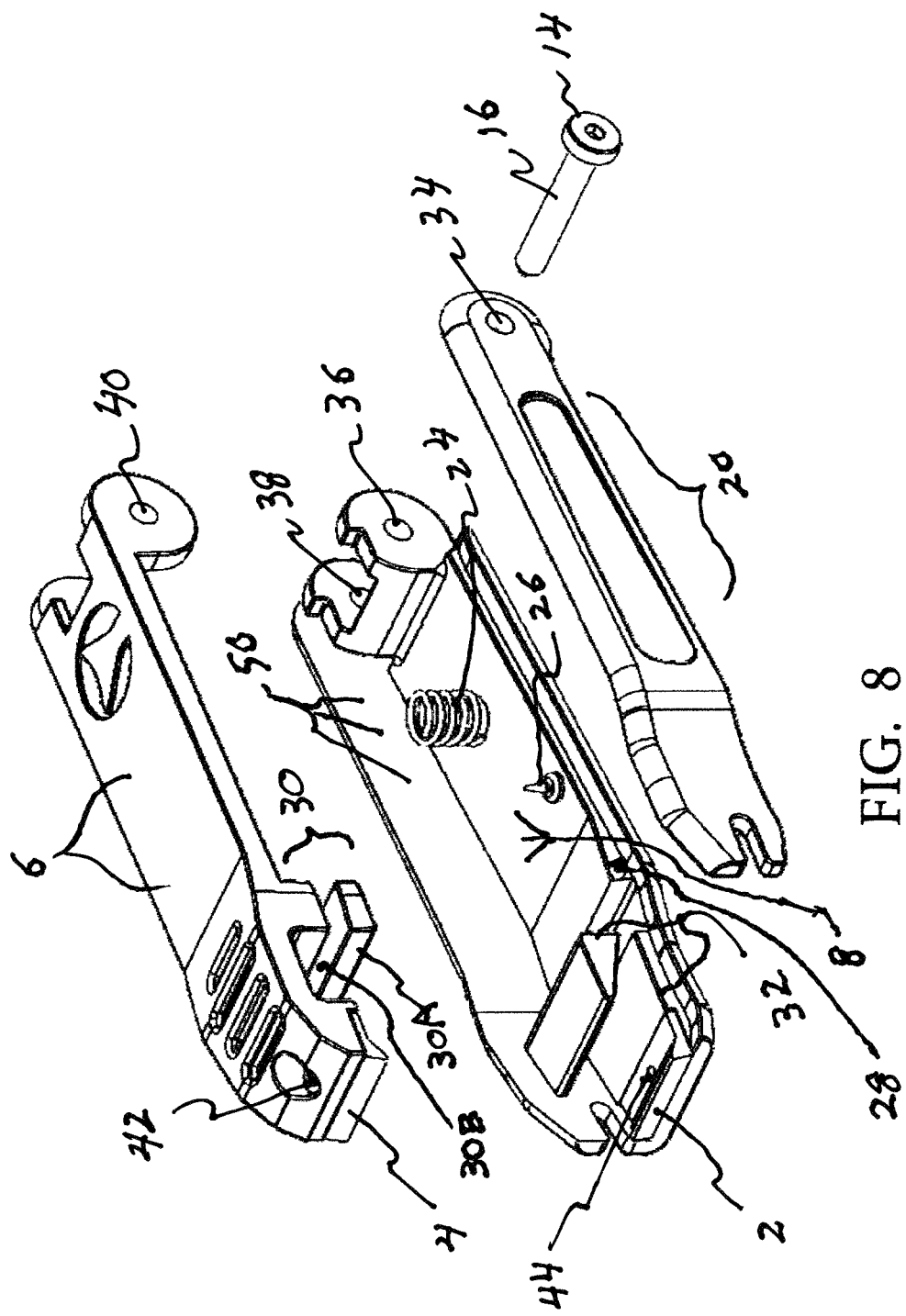
FIG. 8 is an exploded view of the embodiment.

FIG. 5 is a partial side perspective view with the sidewall removed clearly showing cutting members 2, 4 which are removable and replaceable by unscrewing screws 42, 44 as shown in FIG. 8. A rectangular-C-shaped gate member 30 is fixedly attached to upper rigid member 6 as shown in FIG. 8. A second rectangular-C-shaped member 32 is attached to right side wall 50 and lower rigid member 8 as shown in FIG. 8. When the clipper clipping tool 100 is in its original spring biased position as shown in FIG. 5, the lower arm 30A of the rectangular-C-shaped member 30 is becomes a wall blocking the entrance to the enclosure area thereby preventing any clipped remains from leaving the enclosure area.

Figure 6:
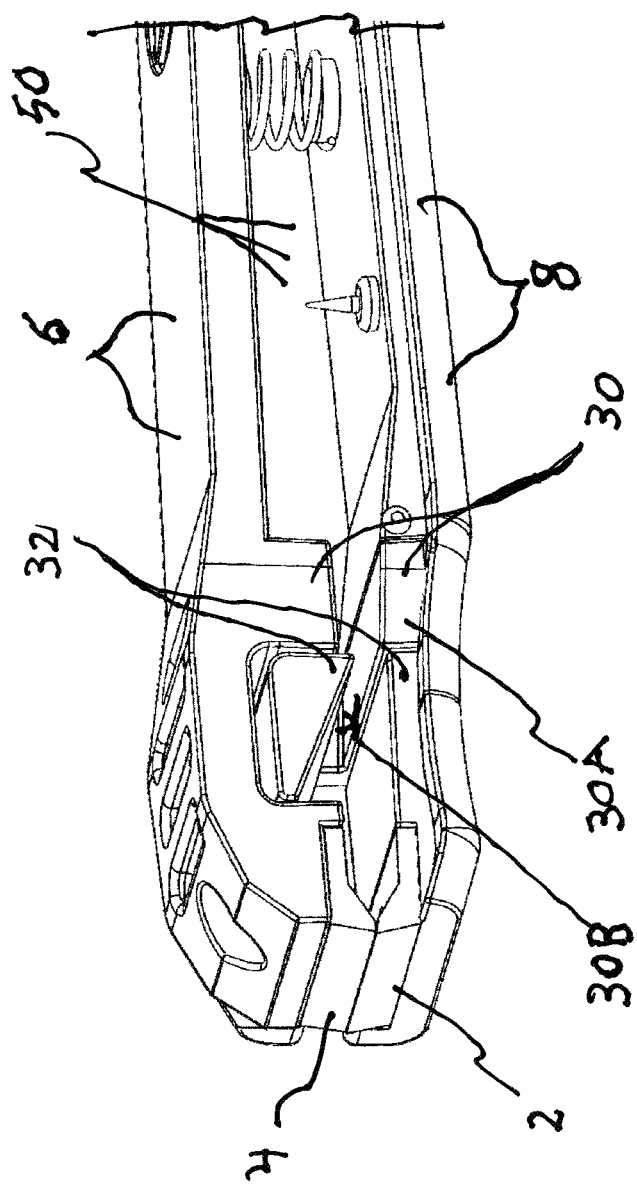
FIG. 6 is a partial side view of the embodiment with the clipper teeth in the closed position with the hinged left side wall member removed.

FIG. 6 is a partial side perspective view showing the cutting members 2, 4 in the closed position, which occurs when the user presses down on upper rigid member 6 while holding the clipper tool 100. When the teeth cutting members 2, 4 are closed, that is while cutting or just finished cutting, the open portions bordered by the three arms of the rectangular-C-shaped members 30,32 are in alignment with each other thereby forming a passage 30B that allows the clipped objects such as a tag end to slide into the enclosed area. This passage then shuts when pressure is released on the rigid members and spring bias returns the rectangular-C-shaped members to the spring biased open position, thereby causing the opening to act as a one-way passage.

Figure 7:
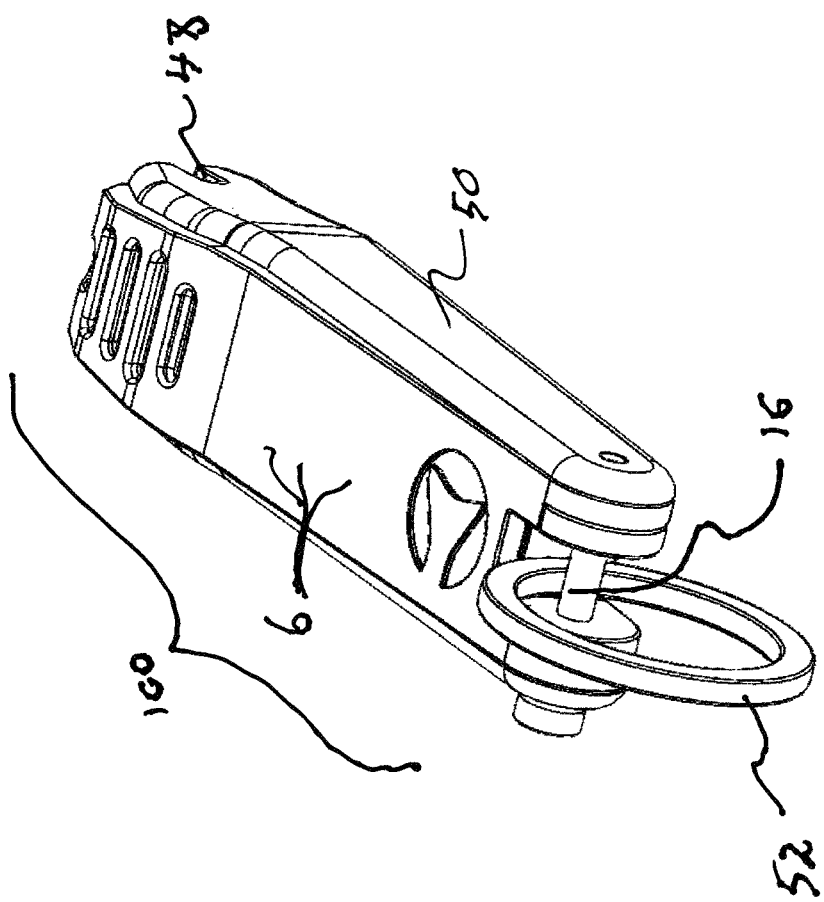
FIG. 7 is a rear perspective view of the embodiment showing the hinge pin and key ring.

FIG. 7 is a rear perspective view of the clipping tool 100 showing optional key ring 52 engaged with hinge pin 16, allowing a user to carry the clipping tool 100 on a keychain or carabiner. The exposed hinge pin area can also retain other items such as a necklace or carabiner, making it easy to carry the clipping tool 100 in a variety of convenient, hands-free ways.

FIG. 8 is an exploded view of the clipping tool 100 that has been used to help describe all the components of the clipping tool 100 described in the above specification. Pin 16 can slide through apertures 34, 36, 38, 40 to rotatably secure the left side member 20 and the upper rigid member 6 to the rear of the lower rigid member 8. It can also be clearly seen that right side member 50 is fixedly attached to lower rigid member 8.

Figure 9:
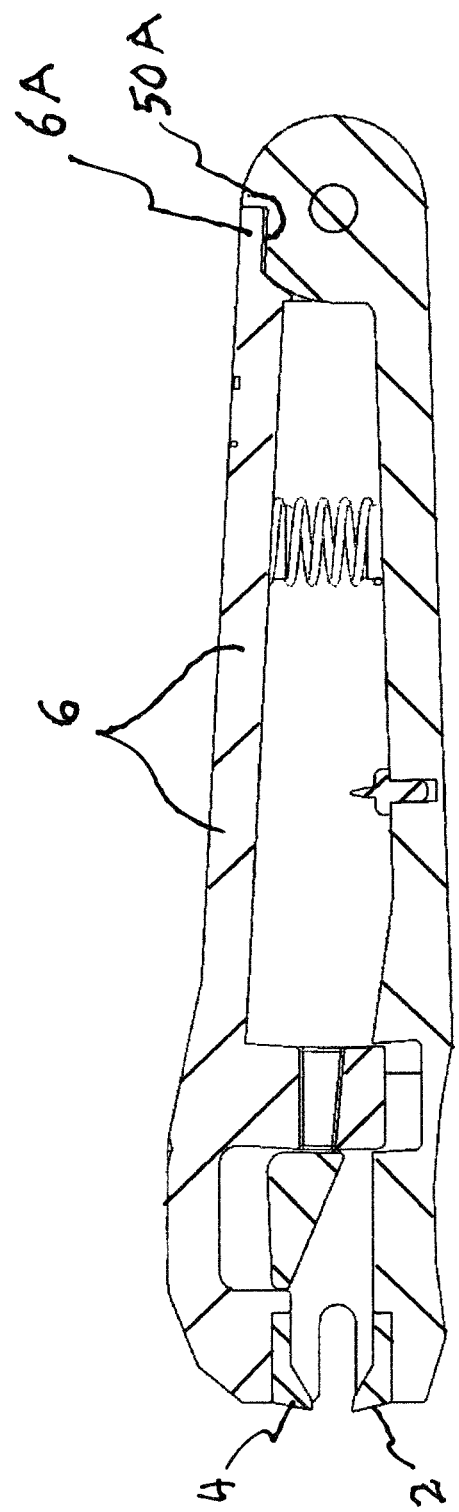
FIG. 9 is a section view of the embodiment with the clipper teeth open.

FIG. 9 is a section view of the clipping tool with the cutting members 2, 4 open. The distal end 6A of upper rigid member 6 is butted up against the distal portion 50A of side wall member 50, acting as a stop to limit the upward travel of upper rigid member 6.

Figure 10:
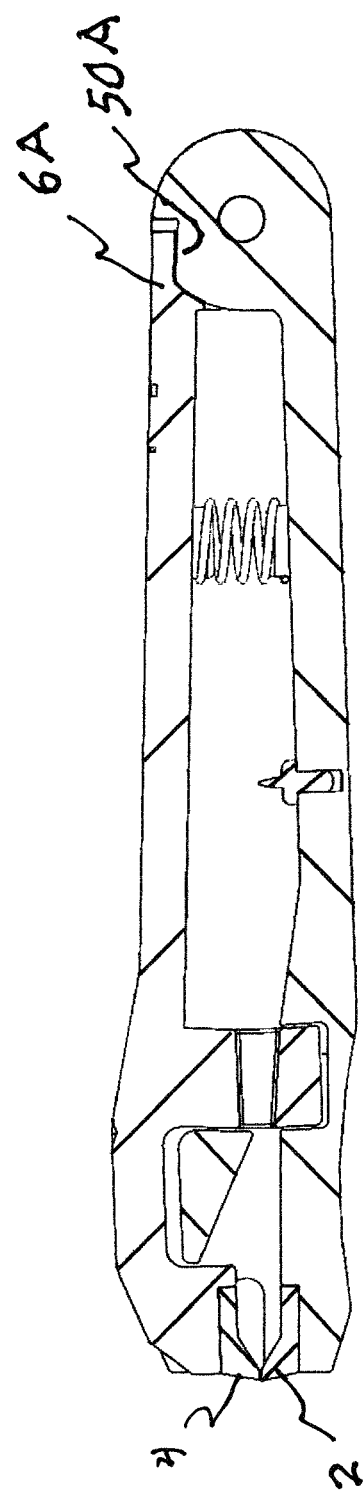
FIG. 10 is a section view of the embodiment with the clipper teeth closed.

FIG. 10 is a section view of the clipping tool with the cutting members 2, 4 closed. In this configuration there is a slight gap between distal end 6A and distal portion 50A.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

In the claims, the word 'comprising' does not exclude the presence of other elements or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A clipping tool comprising:
   an upper rigid member having a front end and a rear end;
   a lower rigid member having a front end and a rear end;
   the clipping tool having a left side and a right side, wherein the left side and the right side are ascertained when a person looks at the clipping tool from the rear end toward the front end;
   a hinged left-side wall having a front end and a rear end;
   a fixed right-side wall having a front end and a rear end;
   a hinge pin member, the hinge pin member hingedly joining the upper rigid member rear end and the hinged left-side wall rear end with the lower rigid member rear end and the fixed right-side wall;
   the upper rigid member, the lower rigid member, the hinged left-side wall, and the fixed right-side wall enclose a hollow cuboid space, the hollow cuboid space having a length, the length being a distance from the front end to the rear end, the cuboid space having a width, the width being a distance across the upper rigid member from the left-side wall to the right-side wall;
   the upper rigid member and the lower rigid member, each comprising a removably attached cutting member disposed at the front ends;
   the upper rigid member further comprising an upper rectangular-C-shaped gate member, the upper rectangular-C-shaped gate member comprising an upper arm, the upper arm of the rectangular-C-shaped gate member fixedly attached to the upper rigid member, and a lower arm, wherein the rectangular-C-shaped member upper arm and the rectangular-C-shaped member lower arm, each having a length equal to the width of the upper rigid member, the upper and the lower arm of the rectangular-C-shaped gate member connected by a perpendicular part, wherein the upper arm, the lower arm and the perpendicular part forming a rectangular-C-shape having a gap open to the hinged left-side wall;
   the lower rigid member further comprising a lower rectangular-C-shaped gate member, the rectangular-C-shaped gate member comprising an upper arm and a lower arm, each having a length equal to the width of the upper rigid member, the upper and the lower arm connected by a perpendicular part, the perpendicular part being attached to the right side wall, wherein the upper arm, the lower arm and the perpendicular part forming a rectangular-C-shape having a gap open to the hinged left-side wall;
   the rectangular-C-shaped gate members being slidingly disposed next to each other, the lower rectangular-C-shaped gate members being closer to the front end;
   the upper C-shaped gate member and the lower C-shaped gate member dividing the hollow cuboid space into a front-end cutting space and a rear end storage space;
   the lower rigid member further comprising a compression spring disposed between the upper rigid member and the lower rigid member;
   the rectangular-C-shaped gate members gaps being furthermore vertically offset with respect to each other such that there is an open space when the upper rigid member is pressed down to the lower rigid member; and
   the hinge pin member further comprising an exposed section between the fixed right-side wall and the hinged left-side wall.

2. The clipping tool of claim 1 comprising a cutting position, wherein the C-shaped gate members align with each other when in the cutting position therefore causing an opening to be formed between the front end cutting space and the rear end storage space;
   the cutting position further characterized by a user pressing the lower rigid member and the upper rigid member toward each other against a bias created by the compression spring, causing the removably attached cutting member to cut, furthermore enabling clippings to slide into the rear-end storage space;
   the clipping tool further comprising a non-cutting position maintained by the compression spring bias, wherein are accumulated in the rear end storage space, the rear end storage space being enclosed by: the upper rigid member, the lower rigid member, the hinged left-side wall, the fixed right-side wall, the lower rectangular-C-shaped member, and the upper rectangular-C-shaped member, wherein the upper and lower rectangular-C-shaped members not being aligned when the clipping tool is in a non-cutting position maintained by the compression 'spring bias, therefore the rectangular-C-shaped members forming a closed wall.

3. The clipping tool of claim 2 wherein clippings are disposed from the rear end storage space by accessing the rear end storage space via the hinged left-side wall.

4. The clipping tool of claim 2 wherein the upper rigid member comprises a stop on the upper rigid member, the stop disposed at the hingedly joined rear end, and a stopper disposed at the fixed right-side wall rear end, the stopper aligned with the upper rigid member stop, wherein the stop and stopper provide limits to a separation between the lower rigid member and the upper rigid member.

5. The clipping tool of claim 2 wherein the hinged loft left-side wall and the fixed right-side wall include U shaped cutouts disposed perpendicularly to the cutting members on front sides of the clipping tool allowing a user to clip longer lengths of fishing line having length larger than the hollow cuboid space width.

6. The clipping tool of claim 1 wherein the upper rigid member having a top surface facing away from the hollow cuboid space, wherein the lower rigid member having a bottom surface facing away from the hollow enclosure wherein furthermore the front end of the upper rigid member top surface being ergonomically curved comprising a plurality of depressions to aid a user's thumb in gripping the clipping tool, wherein furthermore the bottom surface comprises an ergonomic-concave indent to aid a user's pointer finger in holding the clipping tool.

7. The clipping tool of claim 1 wherein the cutting member removably attached to the upper rigid member is retained to the upper rigid member with retaining screws, wherein furthermore the cutting member removably attached to the lower rigid member is retained to the lower rigid member with retaining screws.

8. The clipping tool of claim 1 further comprising a fishhook eyelet cleaning tool member fixedly attached to the lower rigid member in the rear end storage space.

9. The clipping tool of claim 1 further comprising a ring disposed on the hinge pin member exposed section, wherein the exposed section is an anchor member for attaching to a user's carrying device.

\* \* \* \* \*